United States Patent
Loew et al.

(10) Patent No.: US 10,207,648 B2
(45) Date of Patent: Feb. 19, 2019

(54) MULTI-CONFIGURABLE CARGO PANEL SYSTEM

(71) Applicant: Ford Global Technologies, LLC, Dearborn, MI (US)

(72) Inventors: Pattrick Loew, Dearborn, MI (US); Kendra White, Redford, MI (US); Andrew Szymczak, Farnington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 15/404,279

(22) Filed: Jan. 12, 2017

(65) Prior Publication Data

US 2018/0194293 A1    Jul. 12, 2018

(51) Int. Cl.
  *B60R 7/02*    (2006.01)
  *B60R 5/04*    (2006.01)
(52) U.S. Cl.
  CPC .................. *B60R 7/02* (2013.01); *B60R 5/04* (2013.01); *B60R 5/045* (2013.01)
(58) Field of Classification Search
  CPC ............... B60R 7/02; B60R 5/045; B60P 7/14
  USPC ................................................. 296/24.4, 24.3
  See application file for complete search history.

(56) References Cited

U.S. PATENT DOCUMENTS

| | | | | |
|---|---|---|---|---|
| 1,202,985 A | * | 10/1916 | Fogg | B65D 5/4804 217/31 |
| 4,189,056 A | * | 2/1980 | Majewski | B60R 7/02 211/181.1 |
| 4,693,386 A | * | 9/1987 | Hughes | B65D 11/1833 220/1.5 |
| 5,469,999 A | * | 11/1995 | Phirippidis | B60R 5/04 220/23.4 |
| 5,538,148 A | * | 7/1996 | Indyk | B60P 7/135 211/12 |
| 5,590,824 A | * | 1/1997 | Weeks | B60R 7/02 224/42.32 |
| 6,015,071 A | | 1/2000 | Adomeit et al. | |
| 6,056,177 A | | 5/2000 | Schneider | |
| 6,062,146 A | * | 5/2000 | Conners | B60R 5/045 108/44 |
| 6,135,527 A | | 10/2000 | Bily | |

(Continued)

FOREIGN PATENT DOCUMENTS

| | | | |
|---|---|---|---|
| DE | 102013105472 A1 | * 12/2014 | ............. B60R 5/044 |
| DE | 102013105472 A1 | 12/2014 | |
| EP | 2436561 B1 | 9/2012 | |

*Primary Examiner* — Pinel E Romain
(74) *Attorney, Agent, or Firm* — Brooks Kushman P.C.

(57) ABSTRACT

A vehicle having a cargo area includes a first cargo panel having a first recess extending into the first cargo panel, and a second cargo panel having a second recess extending into the second cargo panel. The vehicle includes a cargo floor for supporting the first and second cargo panels in an interlocked configuration in contact with the cargo floor. In the interlocked configuration, the first and second cargo panels are disposed in upright orientations and the second cargo panel is disposed orthogonally to the first cargo panel such that the first recess interfaces the second recess. The vehicle further includes a trim panel for supporting the first and second cargo panels in a coplanar configuration such that first and second cargo panels are spaced from the cargo floor.

20 Claims, 4 Drawing Sheets

(56) References Cited

U.S. PATENT DOCUMENTS

| | | | |
|---|---|---|---|
| 6,435,594 B1 | 8/2002 | Ekonen et al. | |
| 6,733,060 B1* | 5/2004 | Pavkov | B60R 5/04 |
| | | | 108/110 |
| 7,201,421 B2 | 4/2007 | Reynolds et al. | |
| 7,959,390 B2* | 6/2011 | Gorski | B60R 7/02 |
| | | | 410/121 |
| 8,215,693 B2 | 7/2012 | Ulita | |
| 8,528,957 B2 | 9/2013 | Ugalde et al. | |
| 8,763,871 B2 | 7/2014 | Lucas et al. | |
| 9,302,627 B1 | 4/2016 | Shahmehri et al. | |
| 9,340,143 B2 | 5/2016 | Stakoe et al. | |
| 9,783,116 B2* | 10/2017 | Huebner | B60R 7/02 |
| 2006/0180623 A1 | 8/2006 | Reynolds | |
| 2016/0214522 A1 | 7/2016 | Marshall | |
| 2016/0214539 A1 | 7/2016 | Huebner et al. | |
| 2016/0229347 A1 | 8/2016 | Warnecke | |

\* cited by examiner

MULTI-CONFIGURABLE CARGO PANEL SYSTEM

TECHNICAL FIELD

This disclosure relates to cargo area storage systems for vehicles, and more particularly, to a multi-configurable cargo panel system.

BACKGROUND

Vehicles, and particularly sport utility type vehicles, often have cargo areas for storing and transporting cargo. The cargo areas in these types of vehicles are generally open areas defined by the floor, the back of the last row of seats, the side quarter panels, and the end gate of the vehicle. As such, items stored within the cargo areas are often unsecured, and may move about the cargo area due to movement of the vehicle. Furthermore, items stored within the cargo areas are often visible from outside the vehicle.

Storage systems may be incorporated in cargo areas as original equipment or as an aftermarket accessory. Such systems may define fixed, un-adjustable compartments. Fixed storage systems may not provide for an efficient use of the cargo area. Furthermore, storing such storage systems within the vehicle is often counterproductive, as they may take away from available storage space. Storage systems that lack adaptability present problems for customers needing a variety of storage options for the cargo area of the vehicle.

Users often find it desirable to deploy a sight shield or "shade" extending over the cargo area. Such shades may be employed to prevent the viewing of items stored within the vehicle. Example cargo shades employ rollers or panels that are often mounted upon the quarter trim panels of the vehicle. This mounting arrangement has proven to be cumbersome in some instances. Known shades may also suffer from various other drawbacks.

SUMMARY

In one approach, a vehicle having a cargo area includes a first cargo panel having a first recess extending into the first cargo panel, and a second cargo panel having a second recess extending into the second cargo panel. The vehicle includes a cargo floor for supporting the first and second cargo panels in an interlocked configuration in contact with the cargo floor. In the interlocked configuration, the first and second cargo panels are disposed in upright orientations and the second cargo panel is disposed orthogonally to the first cargo panel such that the first recess interfaces the second recess. The vehicle further includes a trim panel for supporting the first and second cargo panels in a coplanar configuration such that first and second cargo panels are spaced from the cargo floor.

In another approach, an interlocking cargo panel system for a cargo area of a vehicle includes a first cargo panel having a first recess extending into the first cargo panel and a second cargo panel having a second recess extending into the second cargo panel. In an interlocked configuration, the first and second cargo panels are disposed in upright orientations and intersect in orthogonal relation such that the second recess interfaces the first recess.

In still another approach, an interlocking cargo panel system for a cargo area includes a first cargo panel having a panel body having a first recess extending into the panel body, and a plurality of arms extending from the panel body and defining a receiving region. The arms may include projections protruding into the receiving region. The interlocking cargo panel system may further include a second cargo panel having a second recess extending into the second cargo panel. The second cargo panel is receivable in the receiving region.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
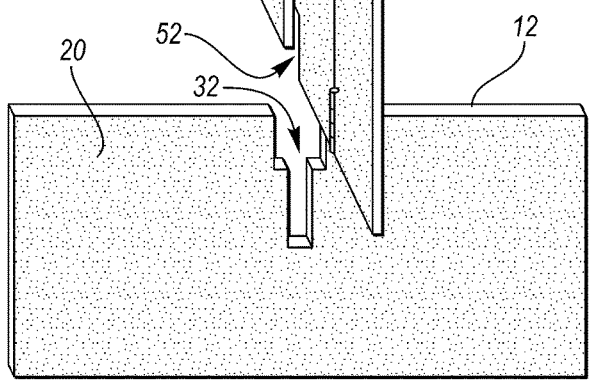
FIG. 1 is an exploded perspective view of cargo panel system.

Referring now to FIG. 1, a cargo panel system 10 includes a first cargo panel 12 and a second cargo panel 14. As described in greater detail elsewhere herein, the cargo panels 12, 14 are adjustable between various configurations and positions. One or both of the cargo panels 12, 14 may be formed of a plastic base material (e.g., polypropylene plastic). The cargo panels 12, 14 may be any suitable thickness (e.g., one-quarter to one-half inch). Furthermore, the cargo panels 12, 14 may be covered in a fabric or carpet material that may, for example, reduced vibration or rattling of the cargo panels 12, 14 and noise associated with such vibration or rattling.

Figure 2:
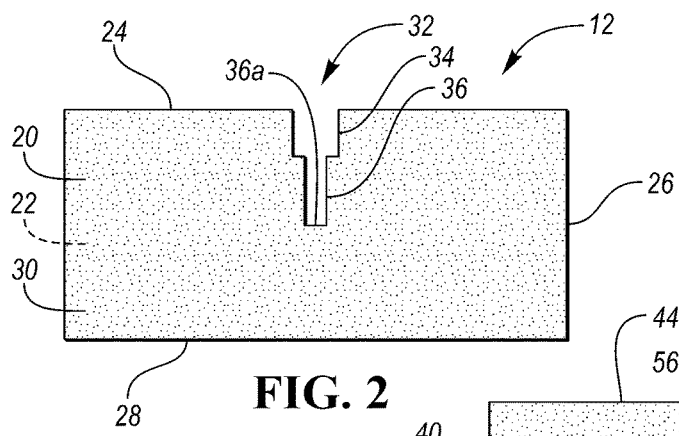
FIG. 2 is a side elevation view of a first cargo panel.

As shown in FIG. 2, the first cargo panel 12 includes a first face 20, a second face 22 (not visible) opposite the first face 20, and four outer edges 24, 26, 28, 30. Outer edges 24 and 28 are preferably longer than outer edges 26 and 30 such that the first cargo panel 12 defines a rectangle. Outer edges 24 and 28 may be referred to as longitudinal edges, and outer edges 26 and 30 may be referred to as side edges.

The first cargo panel 12 further includes an engagement region 32 having a first notch region 34 and a second notch region 36. The second notch region 36 includes an abutment surface 36a. In a preferred approach, the first notch region 34 is wider than the second notch region 36. In this way, the first notch region 34 may receive projections of a plug, as described in greater detail elsewhere herein.

The engagement region 32 is preferably disposed at a center of outer edge 24 of the first cargo panel 12. The engagement region 32 is a recess (or "notch," "slit," or "slot") that extends from outer edge 24 toward outer edge 28 such that abutment surface 36a is disposed at a midpoint of the first cargo panel 12 (e.g., halfway between outer edge 24 and outer edge 28). That is, engagement region 32 preferably has a length of about half the length of outer edges 26, 30.

Figure 3:
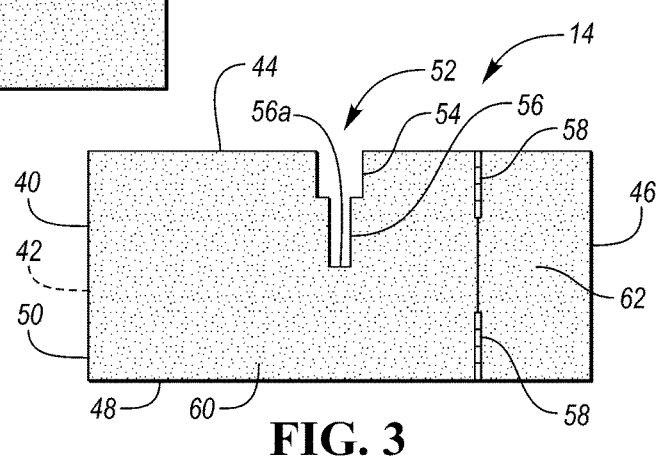
FIG. 3 is a side elevation view of a second cargo panel.

As shown in FIG. 3, the second cargo panel 14 similarly includes a first face 40, a second face 42 (not visible) opposite the first face 40, and four outer edges 44, 46, 48, 50. Outer edges 44 and 48 are preferably longer than outer edges 46 and 50 such that the second cargo panel 14 defines a rectangle. Outer edges 44 and 48 may be referred to as longitudinal edges, and outer edges 46 and 50 may be referred to as side edges.

The second cargo panel 14 further includes an engagement region 52 having a first notch region 54 and a second notch region 56. The second notch region 56 includes an abutment surface 56a that may be configured to abut the abutment surface 36a of the second notch region 36 of the first cargo panel 12, as described in greater detail elsewhere herein. In a preferred approach, the first notch region 54 is wider than the second notch region 56.

The engagement region 52 is preferably disposed at a center of outer edge 44 of the second cargo panel 14. The engagement region 52 is a recess (or "notch," "slit," or "slot") that extends from outer edge 44 toward outer edge 48 such that abutment surface 56a is disposed at a midpoint of the second cargo panel 14 (e.g., halfway between outer edge 44 and outer edge 48). That is, engagement region 52 preferably has a length of about half the length of outer edges 46, 50.

The second cargo panel 14 also preferably includes a hinged region having at least one hinge 58. The hinge 58 rotatably secures a primary panel portion 60 to a secondary panel portion 62. The hinge 58 may be located at approximately halfway between outer edge 46 and a side surface of either the first notch region 54 or the second notch region 56 of the second cargo panel 14. In this way, the secondary panel portion 62 may be folded about the hinge 58 such that the secondary panel portion 62 does not interfere with the engagement region 52, as will be appreciated with respect to the discussion of FIG. 7 elsewhere herein.

The second cargo panel 14 may further include a hinge cover (not shown) disposed over the hinge 58. The hinge cover may be a fabric similar to the fabric of the second cargo panel 14.

Figure 4:
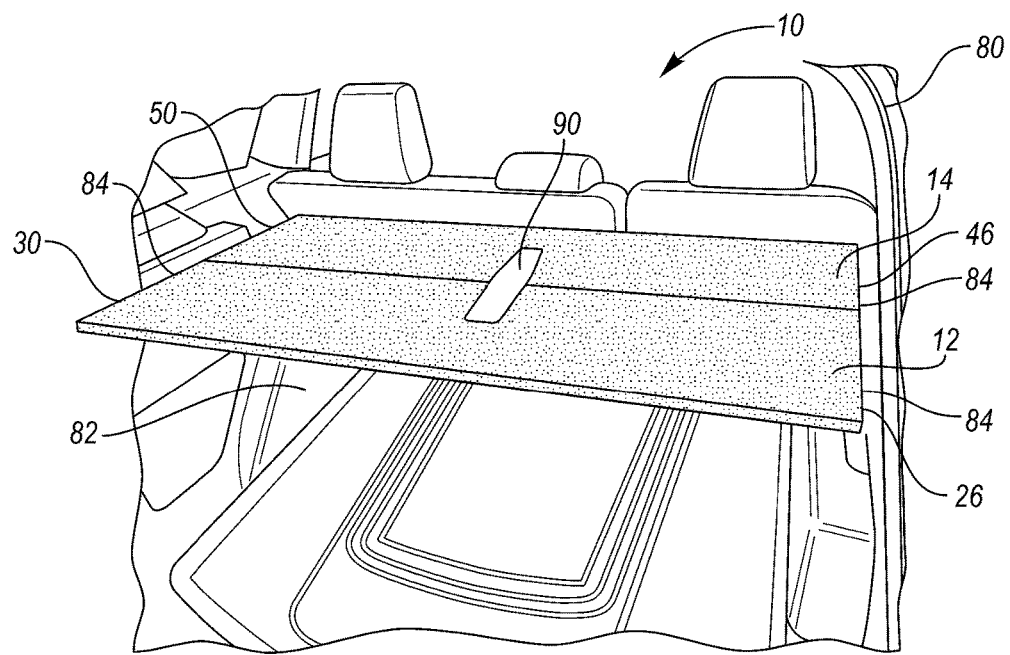
FIG. 4 is a perspective view of a first cargo panel configuration installed in a vehicle.

Referring now to FIG. 4, the first and second cargo panels 12, 14 may be positioned in a first configuration in a cargo area 82 of a vehicle 80. The first configuration may be referred to as a "shade" configuration. In the shade configuration, the first and second cargo panels 12, 14 are disposed in a coplanar configuration and are spaced from the floor of cargo area 82. More specifically, the first cargo panel 12 is supported at outer edges 26, 30 by shelf features 84 disposed on the trim in a cargo area of a vehicle. The second cargo panel 14 is similarly supported at outer edges 46, 50 by the shelf features 84. The shelf features 84 may be, for example, plastic formations (or lips) formed in the trim panel (e.g., quarter-panel piece) of the vehicle 80. In the shade configuration, the cargo panel system 10 substantially covers the cargo area 82 to hide cargo stored in the cargo area 82 from view.

Figure 5:
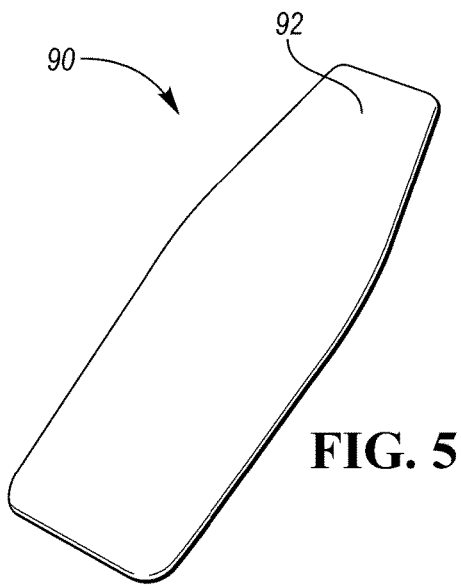
FIG. 5 is a top perspective view of an exemplary plug.
Figure 6:
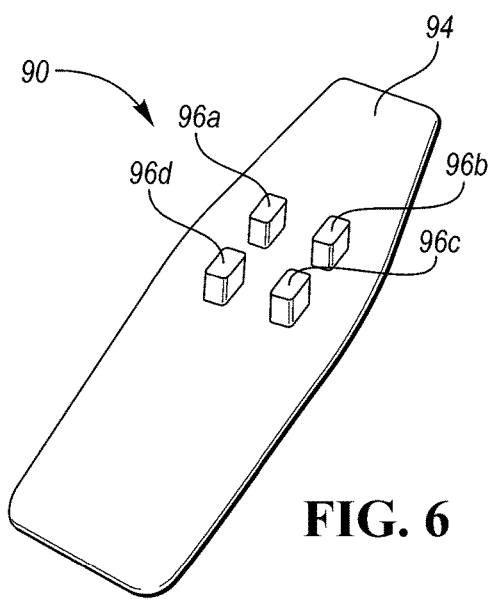
FIG. 6 is a bottom perspective view of the exemplary plug of FIG. 5.

The cargo panel system 10 may further include a plug 90 sized to cover the engagement regions 32, 52 of the first and second cargo panels 12, 14. Referring momentarily to FIGS. 5 and 6, the plug 90 includes a top surface 92 and a bottom surface 94. At least one protrusion, and preferably four protrusions 96a, 96b, 96c, 96d, protrude from the bottom surface 94 of the plug 90. The one or more protrusions contemplated herein may take any suitable shape. In a preferred approach, the protrusions are quadrilateral in cross-sectional shape. In this approach, each protrusion 96a, 96b, 96c, 96d may include two inner walls facing inner walls of adjacent protrusions, and two outer walls facing away from adjacent protrusions. The plug 90 may be formed of any suitable material, such as molded polypropylene (PP).

Referring again to FIG. 4, the plug 90 may be disposed on the first and second cargo panels 12, 14 such that protrusions 96a, 96b, 96c, 96d protrude into engagement regions 32, 52. More specifically, the outer walls of the protrusions may engage inner walls of the first notch regions 34, 54 of the engagement regions 32, 52 to provide an interference fit, thereby securing the plug 90 in place.

In preferred approach, the top surface 92 of plug 90 is substantially flush with upper faces (e.g., first faces 20, 40) of the first and second cargo panels 12, 14. In this way, a recess (not shown) may be formed in the cargo panels 12, 14, or in a fabric disposed over the cargo panels 12, 14. The recess may receive the plug 90 such that the plug 90 is substantially flush with upper faces of the first and second cargo panels 12, 14.

Figure 7:
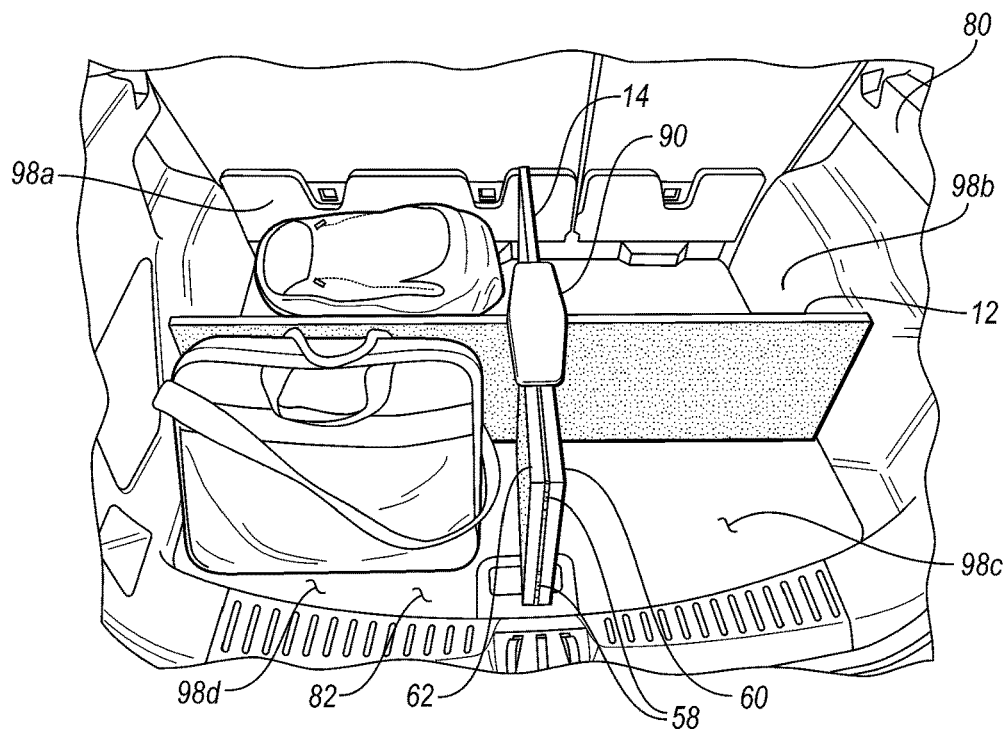
FIG. 7 is a perspective view of a second cargo panel configuration installed in a vehicle.

Referring to FIG. 7, the first and second cargo panels 12, 14 may also be configured in a second configuration in a cargo area 82 of a vehicle 80. The second configuration may be referred to as a "divider" or "interlocked" configuration. In the divider configuration, the first and second cargo panels 12, 14 are arranged to provide discrete compartments (e.g., 98a, 98b, 98c, 98d) within the cargo area 82.

The first and second cargo panels 12, 14 may be assembled in the divider configuration by positioning the first cargo panel 12 laterally across a width of the cargo area 82 in an upright orientation. More specifically, the first cargo panel 12 is disposed in an upright orientation such that outer edge 28 is disposed adjacent the floor of the cargo area 82, and outer edge 24 and engagement region 32 are oriented toward the roof of the vehicle 80 in the cargo area 82.

The second cargo panel 14 may be disposed laterally across a depth of the cargo area 82 in an upright orientation such that the second cargo panel 14 is disposed orthogonal to the first cargo panel 12. During installation, the second cargo panel 14 is preferably oriented such that the first notch region 54 of the engagement region 52 of the second cargo panel 14 is positioned within the first notch region 34 of the engagement region 32 of the first cargo panel 12. The second cargo panel 14 may then be lowered such that the second notch region 56 of the engagement region 52 of the second cargo panel 14 is positioned within the second notch region 54 of the engagement region 32 of the first cargo panel 12. The second cargo panel 14 may be lowered into engagement region 32 until the abutment surface 56a of the second cargo panel 14 abuts the abutment surface 36a of the first cargo panel 12. In this way, the second cargo panel 14 is disposed in an upright orientation such that outer edge 44 and engagement region 52 are disposed adjacent the floor of the cargo area 82, and outer edge 48 is oriented toward the roof of the cargo area 82.

When assembled in the divider configuration, the first and second cargo panels 12, 14 are upright, and the second cargo panel is disposed orthogonally to the first cargo panel, and the engagement region 32 of the first cargo panel 12 interfaces the engagement region 52 of the second cargo panel 14. More particularly, the second cargo panel 14 is received within the engagement region 32 of the first cargo panel 12, and the first cargo panel 12 is received within the engagement region 52 of the second cargo panel 14. In this way, the first and second cargo panels 12, 14 are interlocked at respective engagement regions 32, 52. Because abutment regions 36a and 56a are preferably disposed at approximately half the height of the respective cargo panels 12, 14, lower edges of the first and second cargo panels 12, 14 (e.g., outer edges 24, 44 are coplanar, and upper edges (e.g., 28, 48) are similarly coplanar.

In many vehicles, the depth of the cargo area is less than the width of the cargo area. In such vehicles, the secondary panel portion 62 of the second cargo panel 14 may be rotated about the hinge 58 such that the secondary panel portion 62 is positioned adjacent to the primary panel portion 60. In this way, the length of the second cargo panel 14 is effectively reduced, permitting the second cargo panel 14 to fit within a reduced cargo area depth in the divider configuration.

In a preferred approach, the first and second cargo panels 12, 14 are assembled in the divider configuration within the cargo area 82 of a vehicle 80. In another approach, the first and second cargo panels 12, 14 are assembled in the divider configuration outside of a vehicle 80, and may be subsequently installed in the cargo area 82 of the vehicle 80 in the assembled divider configuration.

In the divider configuration, the first and second cargo panels 12, 14 define a plurality discrete compartments 98a, 98b, 98c, 98d within the cargo area 82. The discrete compartments may store and secure the objects to keep the objects from moving about the cargo area 82 when the vehicle 80 is in motion.

The cargo panel system 10 may receive a plug (e.g., plug 90) when in the divider configuration. As shown in FIG. 7, the plug 90 may be disposed at the junction of the first cargo panel 12 and the second cargo panel 14. The bottom surface 94 of the plug 90 is preferably placed adjacent outer surface 24 of the first cargo panel 12 and adjacent outer surface 48 of the second cargo panel 14. In this approach, the protrusions 96a, 96b, 96c, 96d protruding from the bottom surface 94 of the plug 90 may provide additional stability to the first and second cargo panels 12, 14 in the divider configuration. More specifically, inner walls of protrusion 96a may engage a rear-facing wall (e.g., second face 22) of the first cargo panel 12 and a left-facing wall (e.g., first face 40) of the second cargo panel 14. Inner walls of protrusion 96b may engage a rear-facing wall (e.g., second face 22) of the first cargo panel 12 and a right-facing wall (e.g., second face 42) of the second cargo panel 14. Inner walls of protrusion 96c may engage a forward-facing wall (e.g., first face 20) of the first cargo panel 12 and a left-facing wall (e.g., first face 40) of the second cargo panel 14. Inner walls of protrusion 96d may engage a forward-facing wall (e.g., first face 40) of the first cargo panel 12 and a right-facing wall (e.g., second face 42) of the second cargo panel 14. In this way, rotation of the cargo panels relative to each other is inhibited (i.e., rotation of the second cargo panel 14 relative to the first cargo panel 12 is inhibited).

Figure 8:
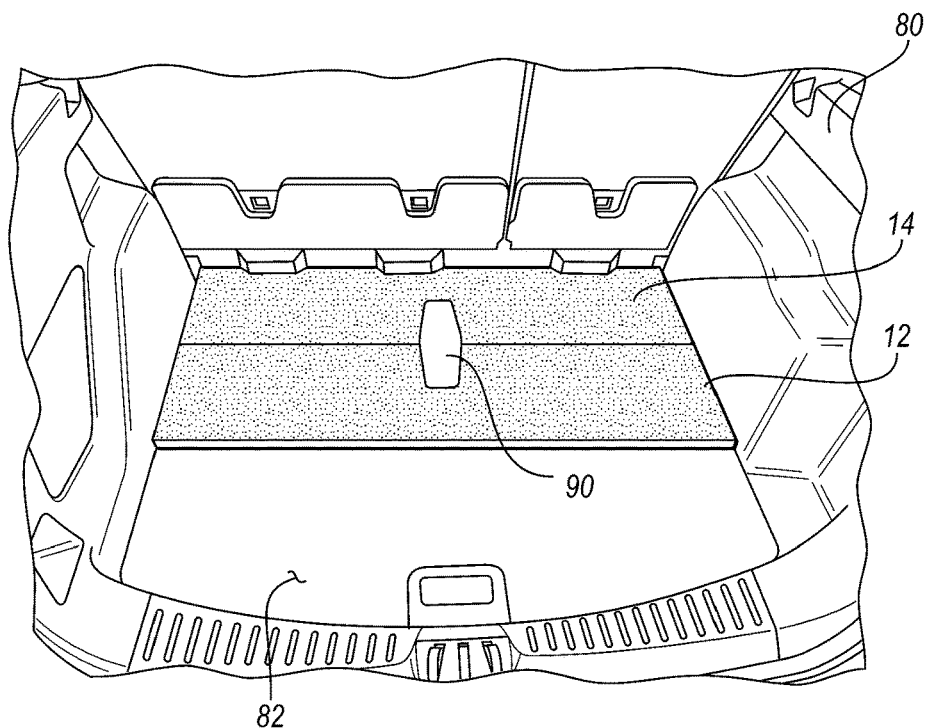
FIG. 8 is a perspective view of a third cargo panel configuration installed in a vehicle.

Referring now to FIG. 8, the first and second cargo panels 12, 14 may be positioned in a third configuration in a cargo area 82 of a vehicle 80. The third configuration may be referred to as a "storage" configuration. In the storage configuration, the first cargo panel 12 and second cargo panel 14 are coplanar, similar to the shade configuration described with respect to FIG. 4. However, in the storage configuration, the first and second cargo panels 12, 14 are not supported in a raised position, but rather, rest on a floor of the cargo area 82. In this way, the first and second cargo panels 12, 14 take up minimal space within the cargo area 82 when not in use.

The cargo panel system 10 may receive a plug (e.g., plug 90) when configured in the storage configuration. As previously described, the top surface 92 of the plug 90 may rest flush against upward-facing walls (e.g., first faces 20, 40) of the first and second cargo panels 12, 14. In this way, cargo may be stored on, and may be moved across, the top surfaces of the cargo panels 12, 14 with minimal interference from the plug 90.

In still another approach (not shown), a plurality of cargo panel systems may be provided. In this approach, a first cargo panel system having first and second cargo panels may be assembled in the divider configuration, and a second cargo panel system having third and fourth cargo panels may be disposed above the first cargo panel system and configured in the shade configuration. When not in use, the first and second cargo panel systems may be configured in the storage configuration, similar to the storage configuration shown in FIG. 8.

Figure 9:
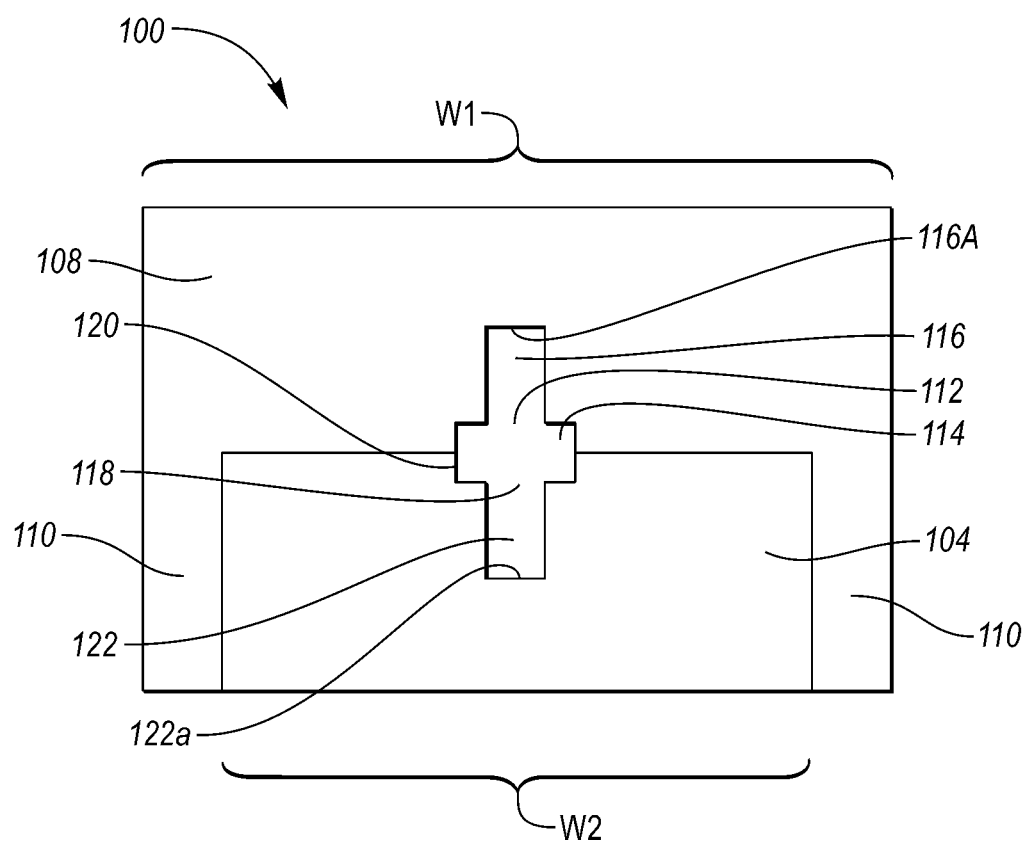
FIG. 9 is a top plan view of a fourth cargo panel configuration.
Figure 10:
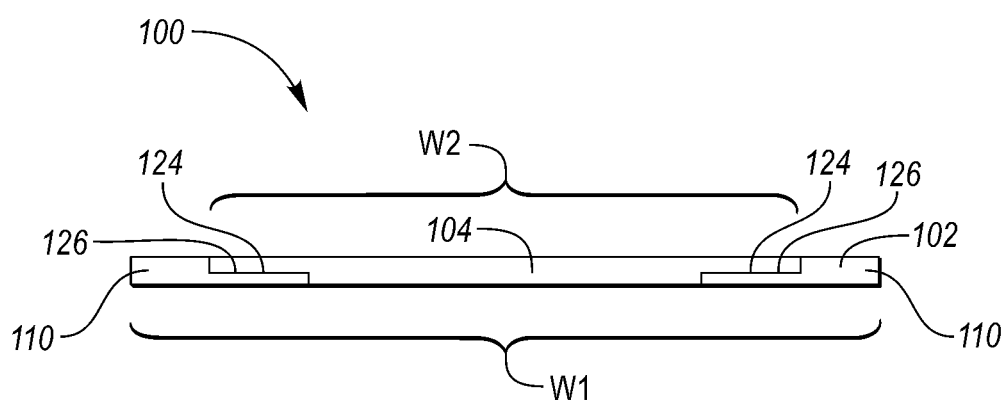
FIG. 10 is a side elevation view of the fourth cargo panel configuration of FIG. 9.

Referring now to FIGS. 9 and 10, another cargo panel system 100 may similarly permit shade, divider, and storage configurations. The cargo panel system 100 includes a primary panel 102 having a first width W1 and a secondary panel 104 having a second width W2 that is less than the first width W1.

The primary panel 102 includes a wall portion 108 and two arm portions 110. The wall portion 108 includes an engagement region 112 having a first notch region 114 and a second notch region 116. The second notch region 116 includes an abutment surface 116a. In a preferred approach, the first notch region 144 is wider than the second notch region 116.

The secondary panel 104 similarly includes an engagement region 118 having a first notch region 120 and a second notch region 122. The second notch region 122 includes an abutment surface 122a that may abut the abutment surface 116a of the second notch region 116 of the primary cargo panel 102.

The arm portions 110 of the primary panel 102 define a receiving region sized to receive the secondary panel 104. The receiving region may have a depth corresponding to a depth of the secondary panel 104 such that the secondary panel 104 may be fully received within the receiving region of the primary panel 102.

As shown in FIG. 10, at least a portion of the arm portions 110 may define "L" regions defining ledges 124. At least a portion of the secondary panel 104 may define a "T" region defining extensions 126. In the shade and storage configurations, the secondary panel 104 is disposed between the arm portions 110 such that the extensions 126 engage and rest upon the ledges 124 of the arm portions 110 of the primary panel 102. In the shade configuration, the primary panel 102 and the secondary panel 104 of the cargo panel system 100 may be supported by shelf features (e.g., shelf features 84) disposed on the trim in a cargo area of a vehicle. In the storage configuration, the primary panel 102 and the secondary panel 104 of the cargo panel system 100 may rest on a floor of a cargo area (e.g., cargo area 82). In another approach (not shown), the secondary panel does not include a "T" region, but rather has a continuous bottom surface adapted rest upon the ledges 124 of the arm portions 110 of the primary panel 102.

The primary and secondary cargo panels 102, 104 may be assembled in the divider configuration by positioning the primary cargo panel 102 laterally across a width of the cargo area in an upright orientation. More specifically, the primary cargo panel 102 is disposed in an upright orientation such that engagement region 112 is oriented toward the roof of the cargo area. The secondary cargo panel 104 may then be disposed laterally across a depth of the cargo area in an upright orientation such that the secondary cargo panel 104 is disposed orthogonal to the primary cargo panel 102. During installation, the secondary cargo panel 104 is preferably oriented such that the first notch region 120 of the engagement region 118 of the secondary cargo panel 104 is positioned within the first notch region 114 of the engagement region 112 of the primary cargo panel 102. The secondary cargo panel 104 may then be lowered such that the second notch region 122 of the engagement region 118 of the secondary cargo panel 104 is positioned within the second notch region 116 of the engagement region 112 of the primary cargo panel 102. The secondary cargo panel 104 may be lowered until the abutment surface 122a of the secondary cargo panel 104 abuts the abutment surface 116a of the primary cargo panel 102.

Once assembled in the divider configuration, the primary cargo panel 102 is disposed in an upright orientation, and the secondary cargo panel 104 is disposed in an upright orientation and extends orthogonally to the primary cargo panel 102 across a depth of the cargo area. In the divider configuration, the primary and secondary cargo panels 102, 104 are arranged to provide discrete compartments within the cargo area, similar to compartments 98a, 98b, 98c, 98d shown in FIG. 7.

As described, the secondary cargo panel 104 has a reduced width W2 as compared the width W1 of the primary cargo panel 102. Thus, the cargo panel system 100 may be provided in the divider configuration in vehicles having a reduced cargo area depth without the secondary cargo panel 104 interfering with a closure of the cargo area.

In many vehicles, the depth of the cargo area is less than the width of the cargo area. In such vehicles, the secondary panel portion 62 of the second cargo panel 14 may be rotated about the hinge 58 such that the secondary panel portion 62 rests adjacent to the primary panel portion 60. In this way, the length of the second cargo panel 14 is effectively reduced, permitting the second cargo panel 14 to fit within a reduced cargo area depth in the divider configuration.

The cargo panel system 100 may also include a plug (not shown), which may be similar to plug 90 and may similarly cover engagement regions 112, 118 when the cargo panel system 100 is configured in the shade and storage configurations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle having a cargo area comprising:
   a first cargo panel having a first recess extending into the first cargo panel;
   a second cargo panel having a second recess extending into the second cargo panel;
   a cargo floor for supporting the first and second cargo panels in an interlocked configuration in contact with the cargo floor, wherein in the interlocked configuration, the first and second cargo panels are disposed in upright orientations and the second cargo panel is disposed orthogonally to the first cargo panel such that the first recess interfaces the second recess;
   a trim panel for supporting the first and second cargo panels in a coplanar configuration such that first and second cargo panels are spaced from the cargo floor; and
   a plug having four discrete and spaced apart protrusions extending from a planar face of the plug, wherein in the interlocked configuration, inner surfaces the protrusions engage the first and second cargo panels to inhibit rotation of the second cargo panel relative to the first cargo panel, and wherein in the coplanar configuration, the plug is disposed substantially flush with upper faces of the first and second cargo panels and outer surfaces of the protrusions engage the first and second recess.

2. The vehicle of claim 1, wherein the first recess includes a first abutment surface and the second recess includes a second abutment surface, and wherein the first abutment surface abuts the second abutment surface in the interlocked configuration.

3. The vehicle of claim 1, wherein the first recess extends from an engagement edge of the first cargo panel and extends approximately half a height of the first cargo panel, and wherein the second recess extends from an engagement edge of the second cargo panel and extends approximately half the height of the second cargo panel.

4. The vehicle of claim 1, wherein in the interlocked configuration, the first cargo panel and the second cargo panel define four discrete compartments within the cargo area of the vehicle.

5. The vehicle of claim 1, wherein the first recess has a first notch region having a first width adjacent an engagement edge and a second notch region having a second width narrower than the first width of the first notch region.

6. The vehicle of claim 1, wherein the second cargo panel further includes a hinge rotatably connecting a primary panel portion of the second cargo panel to a secondary panel portion of the second cargo panel.

7. The vehicle of claim 1, wherein the first and second cargo panels are configurable in a coplanar configuration, and wherein in the coplanar configuration, side edges of the first and second cargo panels engage trim panels of the cargo area of the vehicle to support the first and second cargo panels in a spaced relation from a floor of the cargo area.

8. An interlocking cargo panel system for a cargo area of a vehicle, comprising:
   a first cargo panel having a T-shaped first recess having a first region wider than a second region; and
   a second cargo panel having a T-shaped second recess;
   wherein in an interlocked configuration, the first and second cargo panels intersect orthogonally such that the second region interfaces the second cargo panel and the first region is spaced from the second cargo panel.

9. The interlocking cargo panel system of claim 8, wherein the first recess extends from an engagement edge of the first cargo panel and extends approximately half a height of the first cargo panel, and wherein the second recess extends from an engagement edge of the second cargo panel and extends approximately half the height of the second cargo panel.

10. The interlocking cargo panel system of claim 8, wherein in the interlocked configuration, the first cargo panel and the second cargo panel define four discrete compartments within the cargo area of the vehicle.

11. The interlocking cargo panel system of claim 8, further comprising a plug having four spaced apart protrusions extending from a planar face of the plug.

12. The interlocking cargo panel system of claim 11, further wherein in the interlocked configuration, the four protrusions engage the first and second cargo panels to inhibit rotation of the second cargo panel relative to the first cargo panel.

13. The interlocking cargo panel system of claim 8, wherein the first and second cargo panels are configurable in a coplanar configuration, and wherein side edges of the first and second cargo panels engage trim panels of the cargo area of the vehicle to support the first and second cargo panels in a spaced relation from a floor of the cargo area.

14. An interlocking cargo panel system for a cargo area, comprising:
 a first cargo panel having
  a panel body having a T-shaped first recess, and
  a plurality of arms extending from the panel body and including reduced-thickness inner ledges extending therebetween; and
 a second cargo panel having a T-shaped second recess and reduced-thickness extensions, the second cargo panel receivable in the receiving region such that the reduced-thickness extensions are disposed on the reduced-thickness inner ledges.

15. The interlocking cargo panel system of claim 14, wherein the second cargo panel has a length that corresponds to a length of the arms of the first cargo panel, and a width corresponding to a width of a receiving region defined the arms of the first cargo panel.

16. The vehicle of claim 1, wherein the first and second recess are each T-shaped recesses having a wide region and a narrow region extending from the first region and narrower than the first region.

17. The vehicle of claim 16, wherein in the coplanar configuration, the outer surfaces of the protrusions engage the wide regions of first and second recess in an interference fit engagement.

18. The interlocking cargo panel system of claim 14, wherein the reduced-thickness inner ledges and the reduced-thickness extensions have a combined thickness that corresponds to a thickness of the arms.

19. The interlocking cargo panel system of claim 14, wherein a width of the second cargo panel is less than a width of the first cargo panel.

20. The interlocking cargo panel system of claim 14, wherein the T-shaped second recess interfaces the T-shaped first recess when the reduced-thickness extensions are disposed on the reduced-thickness inner ledges.

\* \* \* \* \*